United States Patent [19]
Jacobsen

[11] 4,170,378
[45] Oct. 9, 1979

[54] COMBINED WIND DEFLECTOR AND WINDOW AWNING ASSEMBLY FOR RECREATIONAL TRAILERS

[76] Inventor: Gerald A. Jacobsen, 13224 Ha Hana Rd., Lakeside, Calif. 92040

[21] Appl. No.: 898,719

[22] Filed: Apr. 24, 1978

[51] Int. Cl.² ............................................. B60J 9/04
[52] U.S. Cl. .................................. 296/1 S; 296/95 C; 296/91
[58] Field of Search ........................ 296/1 S, 95 C, 91

[56] References Cited
U.S. PATENT DOCUMENTS

| | | | |
|---|---|---|---|
| 3,239,267 | 3/1966 | Reynolds | 296/96 |
| 3,425,740 | 2/1969 | De Vaughn | 296/1 S |
| 3,815,948 | 6/1974 | Alford | 296/1 S |
| 3,866,967 | 2/1975 | Landry et al. | 296/1 S |
| 4,063,773 | 12/1977 | Modesette | 296/1 S |

Primary Examiner—Richard A. Bertsch
Attorney, Agent, or Firm—Knox & Knox

[57] ABSTRACT

A device aerodynamically designed to lessen air drag in trailers, commonly referred to as a wind deflector, and specifically related recreational trailers having a window at the front end, the device being manually shiftable to a second position, wherein it is self-supporting, to function as an awning for the front window. When functioning as a drag reducer or wind deflector the device is a simple horizontal wedge extending across the major width of the trailer except that the upper and lower panels of such wedge are isosceles trapezoids, and generally triangular wings are provided at each end of the wedge to provide a carefully limited bilateral deflection of the air for minimizing turbulence and streaking of the sides of the trailer during use.

3 Claims, 9 Drawing Figures

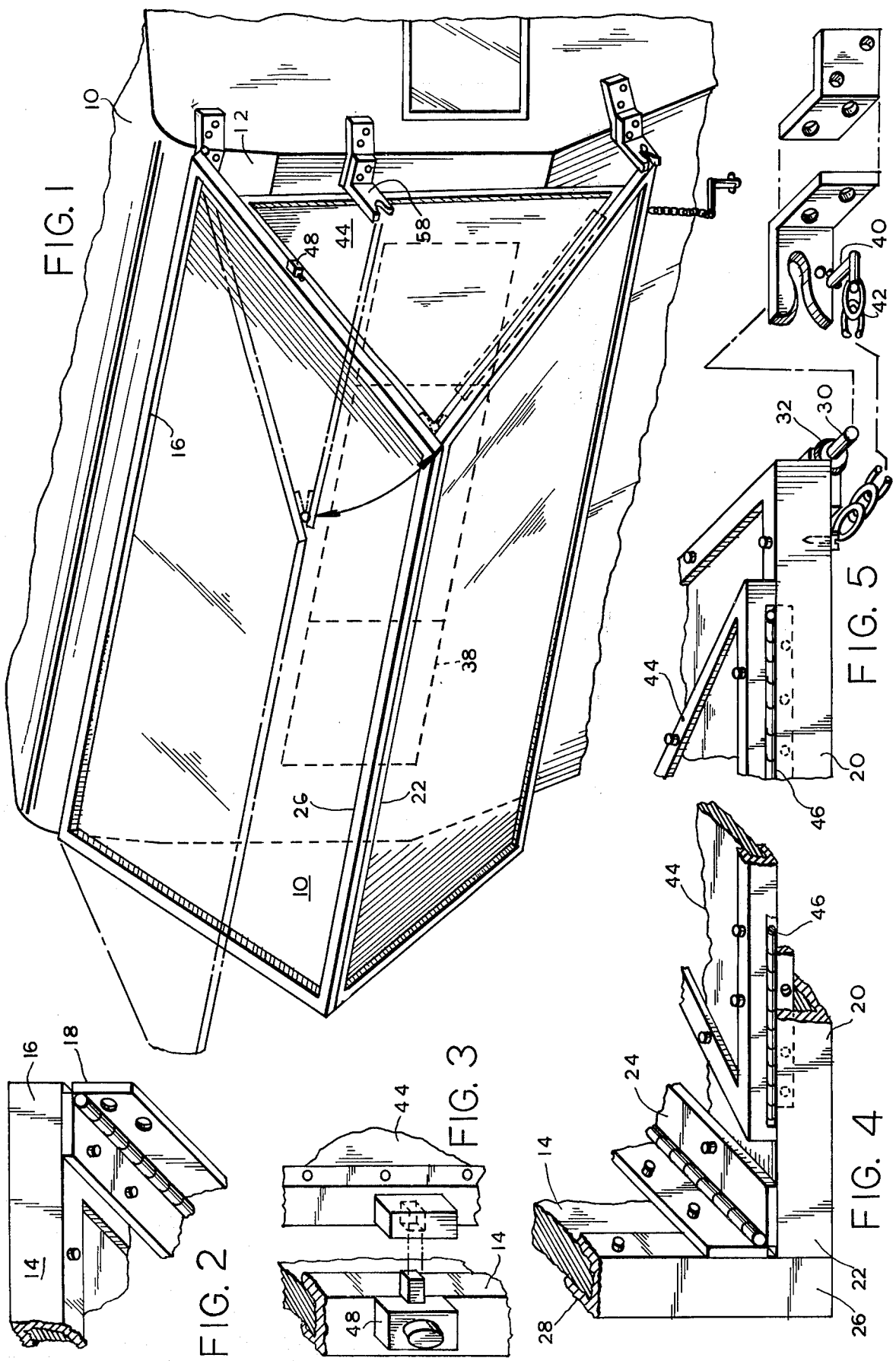

COMBINED WIND DEFLECTOR AND WINDOW AWNING ASSEMBLY FOR RECREATIONAL TRAILERS

BACKGROUND OF THE INVENTION

Reduction of drag forces on vehicles of various types has been recognized as desirable for years, particularly for high speed vehicles and vehicles of great bulk such as recreation trailers and motorhomes since drag is proportional to both speed and vehicle size. Aerodynamic shaping of trailers, as such, has lagged, perhaps due to the premium placed on securing maximum internal available space in the trailers and the desirability of having vertical windows in the front end wall. Several devices have been developed and some have been patented, notably U.S. Pat. No. 3,425,740 which discloses inflexible bulbous fairing members which swing down over the ends of the trailer during travel and swing up into window awning positions when the trailer is parked. Another U.S. Pat. No. 3,815,948 shows panels which are stored on the sides of the trailer when not in use, and U.S. Pat. No. 3,239,267 shows five triangular panels hinged together to define a pointed pyramid which when folded is supported as an awning by separate posts on the front of the trailer. Still another U.S. Pat. No. 3,866,968 proposes deflectors fixedly mounted on the forwardly projecting frame of the trailer. There exists a need, however, for a practical deflector of simple, rugged, light-weight construction and easily handled form which can be economically produced and which is aerodynamically effective for drag reduction and secondarily convertible to a front window awning as a simple one-man operation.

SUMMARY OF THE INVENTION

As claimed, the hereindisclosed apparatus is an adequate response to the immediately abovementioned need, being a dual purpose retrofit or original equipment attachment particularly for recreational trailers, to provide drag reduction and alternatively a front window awning comprising, in brief, a pair of isosceles trapezoidal inflexible panels hinged together and with the upper panel hinged to the top of the front wall of the trailer, with bracket fasteners on trailer above and below the window for alternative securement of the lower panel in deflector or awning mode. In the deflector mode the panels define a broad based wedge and wings are hingedly secured to one of the panels to close the ends of the wedge, these wings being easily folded flat between the panels when the device is in the awning mode.

BRIEF DESCRIPTION OF THE DRAWING

FIG. 1 is a fragmentary isometric view of the front end of a trailer with this invention attached thereto and shown in deflector mode in full lines and in awning mode in dash line;

FIG. 2 is a detail view to illustrate the hinge connection of the upper panel to the front end wall of the trailer;

FIG. 3 is a detail view to illustrate latch means to hold a closure wing in vertical position when the panels are in deflector mode;

FIG. 4 is a fragmentary view of the hinged connection of the panels at the apex of the wedge defined by the panels, and also illustrating the hinge connection of a wing on the lower panel;

FIG. 5 is an exploded view illustrating another corner portion of the lower panel and the attached wing, and further illustrating means for releasibly fastening the lower panel to the trailer, in the deflector mode;

DETAILED DESCRIPTION OF A PREFERRED EMBODIMENT

Figure 7:
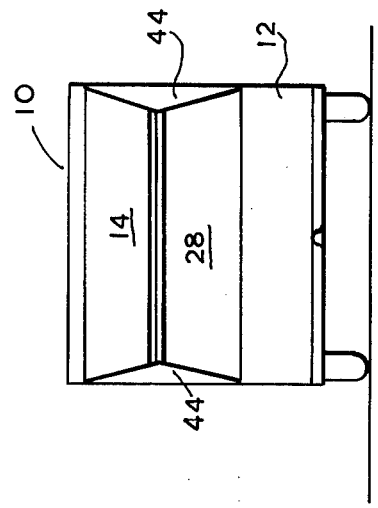
FIG. 7 is a diagrammatic view taken from the right hand side of FIG. 6.

Referring now to the drawings, a trailer 10 having a front end wall 12 is fitted with the claimed invention. An upper panel 14 of isosceles trapezoid form has the longer 16 of its parallel edges hinged as at 18, in FIG. 2, to a top exterior portion of the front end wall 12 of the trailer.

A lower panel 20 having one edge 22 equal to the edge 26 in length is hinged as at 24 to the shorter edge 26 of the upper panel as indicated best in FIG. 4. The two panels 14 and 20 may be identical in shape and dimension although this is not essential as long as the herein denominated shorter edges 22 and 26 are equal in length. In all cases it is preferred that the panels will be of stiff, durable material, quadrilateral, and marginally reinforced with edging such as the channel 28 shown in FIGS. 1–5 or the equivalent to assure retention of form and to lessen vibration. The lower panel 20 and a lower portion of the front end wall of the trailer are equipped at each side with interengaging fastener means illustrated as a prong 30 with a boss 32 attached to the lower edge protion of the lower panel, the prong 30 being engageable in a slot 34 of a bracket 36 secured to the trailer by lag bolts or the like beneath the level of the front window 38 of the trailer as best shown in FIGS. 1 and 5. A locking pin 40, tethered to the lower panel as indicated at 42, locks the lower panel in position.

Figure 6:
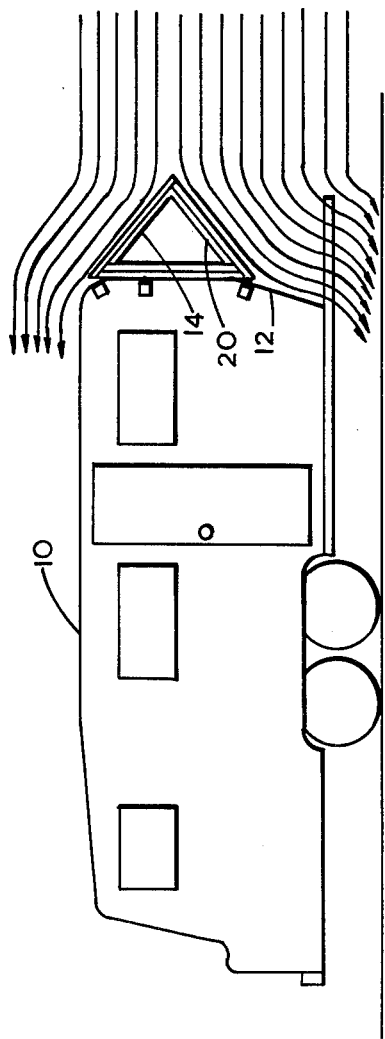
FIG. 6 is a diagrammatic view of a trailer with the panels in deflector mode and indicating the functioning thereof.

In the deflector mode the panels 14 and 20 define a wedge with a forward apex and the ends of such wedge are closed by wings 44 of triangular form dictated by the dimensions of the panels 14 and 20 and the included angle, said wings 44 being fragmentarily shown in FIGS. 4 and 5 and shown in FIGS. 1, 6 and 7 in operative vertical position. As illustrated the wings, one on each side, are hinged as at 46 to the lower panel and latch means 48 releasibly secures the wings to the upper panel 14, as illustrated at 48 in FIG. 1 and in some detail in FIG. 3.

Figure 9:
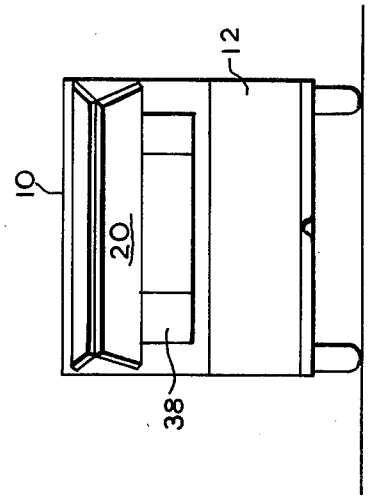
FIG. 9 is a diagrammatic view taken from the right hand side of FIG. 8.
Figure 8:
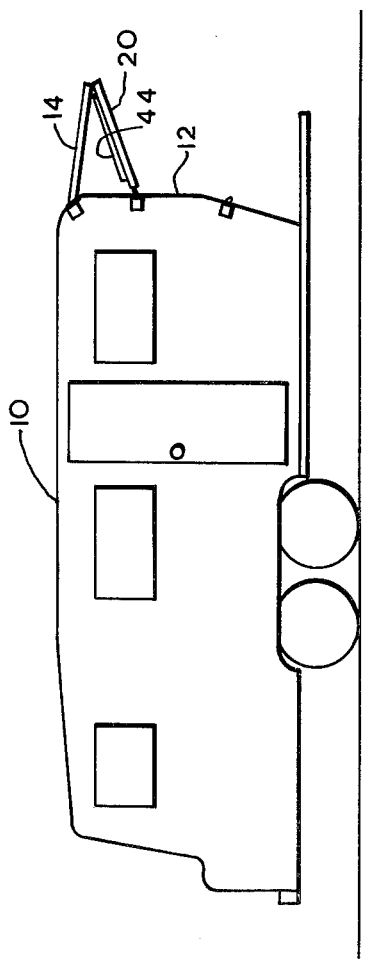
FIG. 8 is a diagrammatic view of a trailer with the panels in awning mode.

When the latches 48 are released the wings fold down flat against the inner surface of the lower panel 20, permitting the raising of the lower panel from the deflector mode to the awning mode. To secure the panels in the latter position a second fastening means is provided, comprising slotted brackets 50 on the front end wall of the trailer immediately above the level of the window 38 to receive the prong 30 when the panels have been lifted to constitute an awning, as illustrated in dash line in FIG. 1 and illustrated diagrammatically in FIGS. 8 and 9.

The operation of this apparatus has been referred to adequately in the foregoing and further description appears unnecessary.

What I claim as new and desire to secure by Letters Patent, is:

1. A combined wind deflector and window awning assembly for recreational trailers having a front end wall with a window therein, said combined deflector and awning comprising:
   (a) an upper panel of isosceles trapezoidal configuration having the longer of the parallel edges thereof horizontally hinged to a top exterior portion of the front end wall of a trailer;
   (b) a lower panel of similar configuration having the shorter of the parallel edges thereof hinged to the shorter of the parallel edges of said upper panel;
   (c) fastening means releasibly attaching the longer of the parallel edges of the lower panel to a portion of the front wall of the trailer below said window, so that said panels, in a first position thereof define a wedge with a single horizontal apex shorter than said longer leg; and
   (d) further fastening means capable of directly attaching said lower panel, at its said longer edge, to a portion of the front wall of the trailer above said window, so that said panels in a second position thereof define a self-supporting awning over said window.

2. Structure according to claim 1 and including genally triangular side closure wings hinged to the ends of one of said panels and having latch means for easily releasible connection to the other panel, and dimensioned to extend vertically and to substantially close the ends of said wedge defined by the panels in said first position, said wings alternatively being unlatched and disposed on top of said one of the panels when said panels are shifted to define said self-supporting awning.

3. Structure according to claim 2 wherein said closure wings are hinged to siad lower panel only and latched to said upper panel when the panels are in said first position.

* * * * *